O. P. PARR.
GATE FASTENER.
APPLICATION FILED AUG. 4, 1915.
1,231,421.
Patented June 26, 1917.
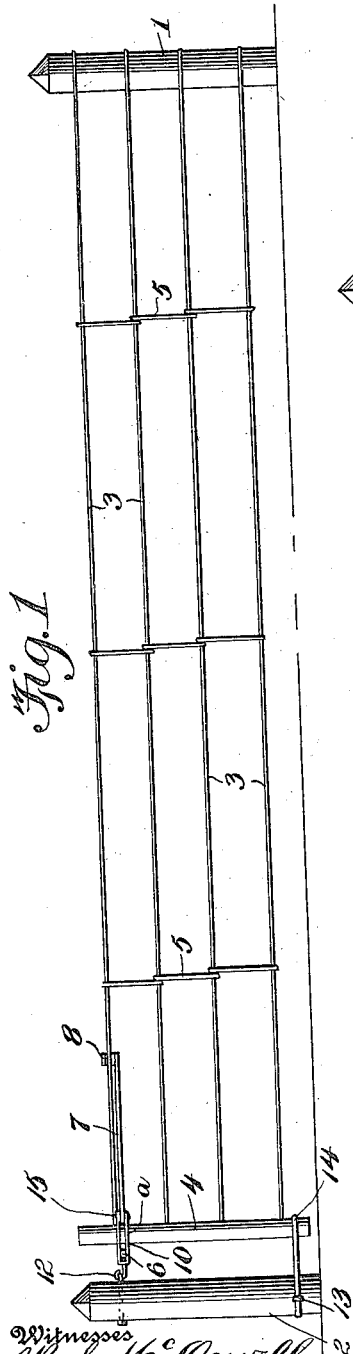
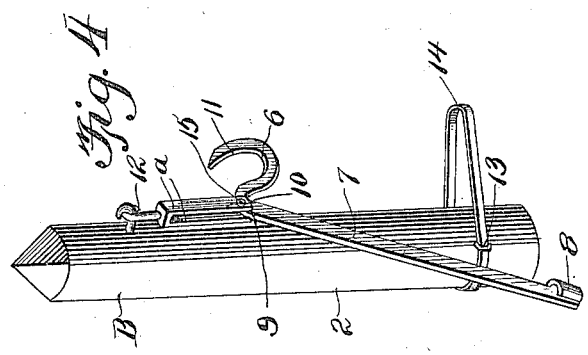
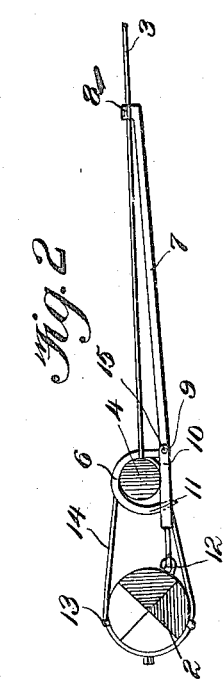
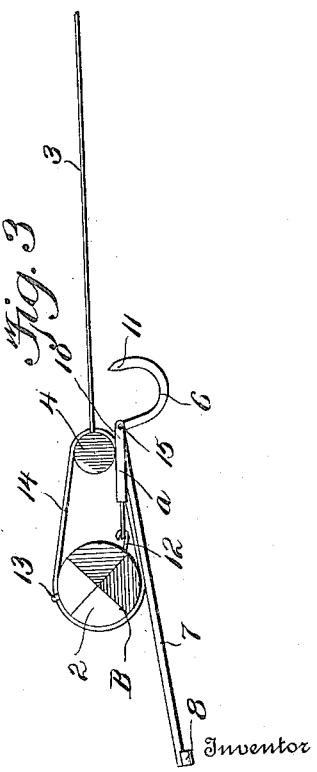
Inventor
Otto P. Parr
By Victor J. Evans
Attorney
Witnesses
W. S. McDowell
Wm. Bagger

UNITED STATES PATENT OFFICE.

OTTO P. PARR, OF LEAD, SOUTH DAKOTA.

GATE-FASTENER.

1,231,421.     Specification of Letters Patent.     Patented June 26, 1917.

Application filed August 4, 1915. Serial No. 43,641.

*To all whom it may concern:*

Be it known that I, OTTO P. PARR, a citizen of the United States of America, residing at Lead, in the county of Lawrence and State of South Dakota, have invented new and useful Improvements in Gate-Fasteners, of which the following is a specification.

This invention relates to wire gates, and it has for its object to provide a fastening device of simple and improved construction, whereby the gate may be secured in closed position.

A further object of the invention is to provide a simple and improved fastening device whereby the gate when closed may be placed under tension so that the wires composing the gate shall be kept straight and taut.

With these and other ends in view, which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a view in elevation of a gate provided with the improved fastening device.

Fig. 2 is a top plan view of a portion of the gate showing the fastening device applied and in closed position.

Fig. 3 is a detail plan view of a portion of the gate showing the fastening device in its opening position before being permitted to drop.

Fig. 4 is a perspective view showing the gate post with which the fastening device is connected, the latter being shown in inoperative position.

Corresponding parts in the several figures are denoted by like characters of reference.

The gate posts 1 and 2 may be ordinary fence posts suitably spaced apart. These posts may be braced and reinforced in any suitable and convenient manner.

The gate is composed of a plurality of strands of wire 3, 3 connected at one end with the post 1 and connected at their opposite ends with a gate upright 4. The strands 3 are of such length that when they are stretched and taut, the upright 4 will be slightly spaced from the post 2. The individual wires 3, 3 are connected at intervals by brace wires 5.

The fastening device comprises an approximately U-shaped hook member 6 having an elongated shank or handle 7 provided at its extreme end distant from the hook 6 with an upturned hook-shaped catch 8. The heel 9 of the fastening device, which defines the junction of the hook 6 and the handle 7, is pivotally connected with a fork 10 between the side members of which $a$, $a$ the point or bill 11 of the hook 6 may be inserted. The fork 10 is swiveled upon a pin or bolt 12 which is suitably connected with the fence post 2.

Suitably secured upon the post 2 near the lower end thereof by means of staples or keepers 13 is a link 14 of wire or other suitable material, into which the lower end of the upright 4 may be inserted. The fastening device is preferably connected with the post B in such a position as to enable it to engage the upright 4 near the upper end of the latter, although it may within the scope of the invention be mounted in a position to engage the said upright 4 at any point intermediate the upper and lower ends thereof.

In the operation of this device, the lower end of the upright 4 is placed in the loop or link 14. The hook 6 is now placed in engagement with the upright 4 near the upper end of the latter, after which by manipulating the handle 7, the hook is swung upon the pivot 15 whereby it is connected with the fork 10 until the point or bill of the hook enters between the side members $a$ of said fork. By this operation, the wire strands 3 of the gate are drawn taut, and the hook-shaped catch 8 at the extremity of the handle 7 is now placed in engagement with one of the wire strands, thereby retaining the parts in adjusted position.

As will be seen from the foregoing description, taken in connection with the drawing hereto annexed, a gate fastening has been provided which is simple in construction, easily applied to wire gates of ordinary construction and thoroughly efficient for the purposes for which it is provided.

Having thus described the invention, what is claimed as new, is:—

A gate fastening device for wire gates comprising a fork, a swivel member whereby the fork is loosely connected with the gate post, and a hook having the heel thereof pivoted in the fork and equipped with a handle member extending from the heel and whereby said hook may be swung in engagement with an upright member of the gate, the elongated handle of the hook having a terminal catch adapted to engage one of the gate wires, and the fork with which the hook is pivotally connected being adapted to receive the point of the hook when the latter is engaged with the upright member of the gate.

In testimony whereof I affix my signature in presence of two witnesses.

OTTO P. PARR.

Witnesses:
JUDSON MANSFIELD,
S. O. SPANN.

Copies of this patent may be obtained for five cents each, by addressing the "Commissioner of Patents, Washington, D. C."